Inventor
Robert O. Bill
By Philip A. Friedell
Attorney

April 21, 1953  R. O. BILL  2,635,583
PRESSURE FLUID MOTOR AND COMBINED TELESCOPIC
GUIDE AND HOUSING THEREFOR
Filed Oct. 21, 1949  2 SHEETS—SHEET 2
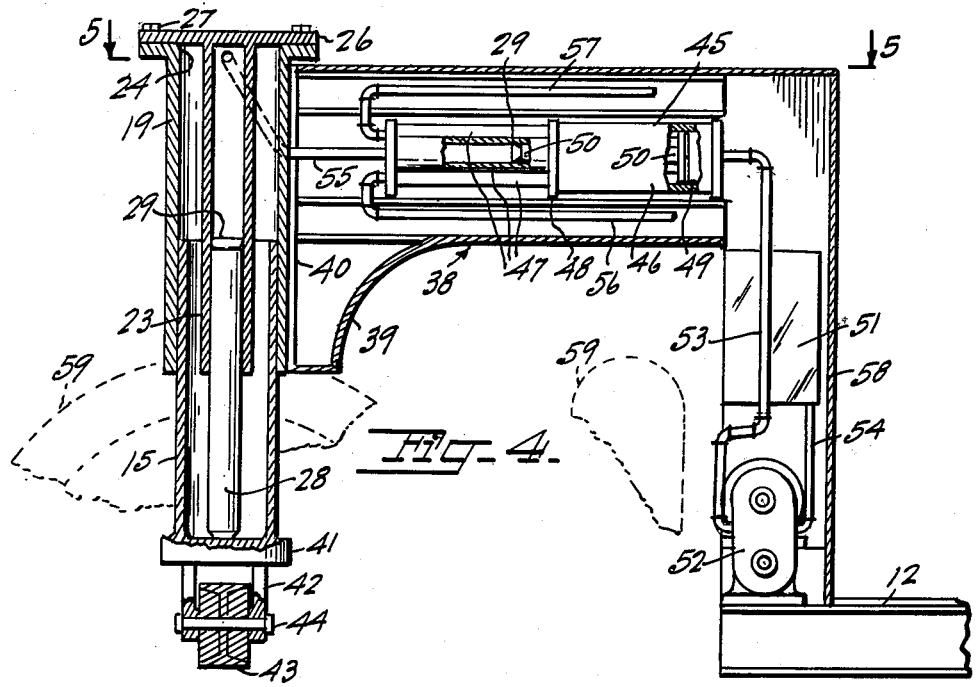
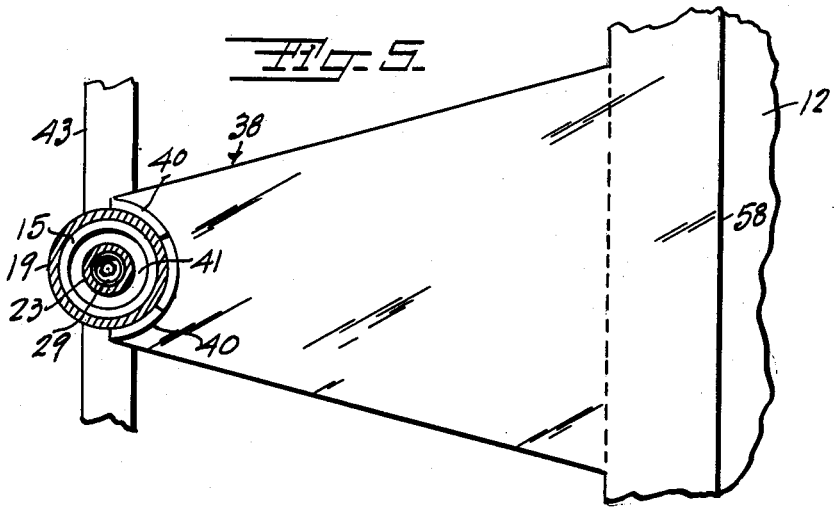
Inventor
Robert O. Bill
By Philip A. Friedell
Attorney Patented Apr. 21, 1953

2,635,583

UNITED STATES PATENT OFFICE 2,635,583

PRESSURE FLUID MOTOR AND COMBINED TELESCOPIC GUIDE AND HOUSING THEREFOR

Robert O. Bill, San Leandro, Calif.

Application October 21, 1949, Serial No. 122,746

5 Claims. (Cl. 121—46)

This invention relates to improvements in hydraulic means for elevating and lowering the beds of vehicles, and particularly to the rear end of the bed as applied to stub axles which permit the bed to be lowered to rest on the supporting surface for the vehicle, such as a road, platform, or on the ground.

This invention is an improvement over my copending application Serial Number 128,404, filed November 19, 1949, now Patent No. 2,598,031 and Letters Patent numbered 2,475,443, issued July 5, 1949, 2,560,714 and 2,560,715, issued July 17, 1951, and 2,546,491, issued March 27, 1951; in that the guides function only as guides, and with the pressure fluid motors located within the guides and requiring a minimum amount of fluid for their operation, and because the pressure fluid motors are readily removable for replacement or repair without affecting other parts of the vehicle. Furthermore, the housing of the pressure fluid motors within the guides protects the jacks against dust and dirt so that the plunger, piston, or piston rod, or any packing will not lose its sealing efficiency because of wear induced through admission of grit.

Thus it will be realized that a worthwhile improvement has resulted, increasing the life of the pressure fluid motors and requiring far less attention and repair, and greatly decreasing the amount of fluid to be delivered for any elevating or lowering adjustment of the vehicle bed.

The objects and advantages of the invention are as follows:

First, to provide a vehicle bed with elevating and lowering means and with separate guiding means with the elevating and lowering means housed within the guiding means for exclusion of dust and grit.

Second, to provide a vehicle bed with elevating and lowering means which requires a minimum amount of liquid for its operation.

Third, to provide elevating and lowering means and guiding means which is applicable to either, stub or through axles, and equally applicable to single or tandem wheel constructions and which in the case of tandem wheels permits relative vertical movements between the respective wheels to compensate for variations in the heights of support surfaces for the respective wheels.

Fourth, to provide elevating and lowering means as outlined which includes pressure fluid motors which are removable and replaceable at will without requiring any disassembly of guiding means or other parts of the vehicle.

Fifth, to provide elevating and lowering means as outlined which is relatively simple in construction and operation, and easily removed and replaced.

In describing the invention reference will be had to the accompanying drawings, in which:

Fig. 4 is a side sectional elevation through the invention as applied to a swivel front axle.

Fig. 5 is a top plan view of Fig. 4 with the guide and cylinder shown in section and taken on a line 5—5 of Fig. 4.

In some of the previously mentioned applications and patents the guiding means and the pressure fluid motors were one and the same, the specific structures performing both functions simultaneously. This invention incorporates the same guiding means, but provides a separate pressure fluid motor which is housed within the guiding means, the pressure fluid motors being thus protected against dirt and grit, thus assuring long life and positive operation.

Figure 1:
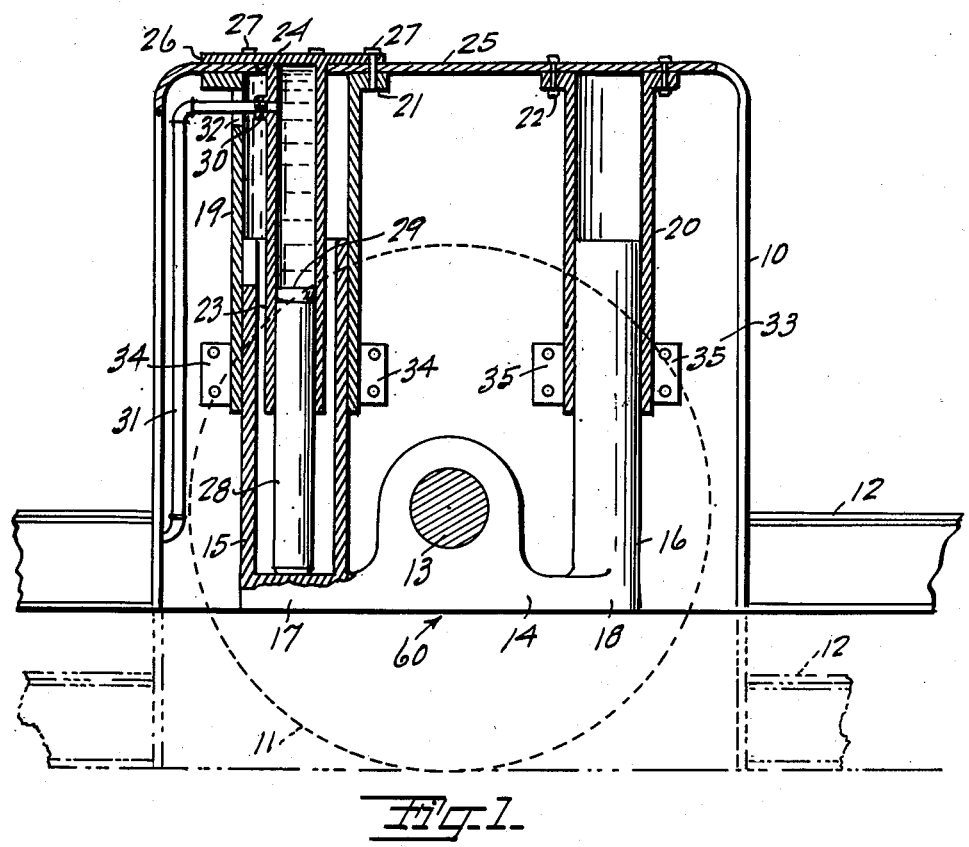
Fig. 1 is a sectional elevation through the invention as applied to a stub axle and single wheel.

As illustrated in Fig. 1, a wheel housing 10 is provided for each wheel 11 and is made rigid with the bed 12 of the vehicle, this wheel housing or fender being made sufficiently strong and rigid to support that portion of the vehicle when loaded to capacity. This construction applies only to wheels the direction of travel of which is fixed, such as the rear wheels of a truck, trailer or semi-trailer, and includes a stub axle 13 which is fixed in a depending cross-head 14, with the wheel rotatable on the axle. A pair of sleeves 15 and 16 are respectively formed integral with or fixed to the respective arms 17 and 18 of the crosshead and project upwardly in parallel.

Another pair of sleeves 19 and 20 are respectively fixed to the underside of the top member of the fender as indicated at 21 and 22 and are slidable over the sleeves 15 and 16, forming two telescopic guides.

The pressure fluid motor consists of a cylinder 23 which is freely mounted within a passage 24 formed through the top member 25 of the fender, and terminates in a head 26 by which it is bolted down on the top member as indicated at 27. A plunger 28 operates within this cylinder and has suitable sealing means such as a cup leather 29 secured to its upper end, and a fluid connection 30 is provided for the pressure fluid line 31; a suitable passage being provided as indicated at 32 for making the connection to the cylinder.

The other pair of sleeves may include the pressure fluid motor, but this has been found unnecessary for all normal loading, therefore is shown as merely consisting of the telescopic guide the function of which is to maintain the alignment of the stub axle so that the wheel track along the path of travel.

As will be noted, the cylinders, in addition to being fixed to the underside of the top member 25 are also fixed to the back member 33 by brackets 34 and 35, near the lower end, thus providing an extremely rigid mounting for the cylinders.

For dual wheels, or any number of wheels in tandem, the structure is the same for each of the wheels, including the sleeves 19 and 20, and 15 and 16 for each wheel, with a pressure fluid motor mounted in each of the guides 19 which pressure fluid motors are connected together by a common connection 36 which in turn is connected to the pressure fluid line 31, thus permitting the respective wheels to compensate between each other for irregularities in the surface 37 over which the wheels are traveling; the telescopic sleeves 16 functioning purely as guide and aligning means.

Figures 2, 3:
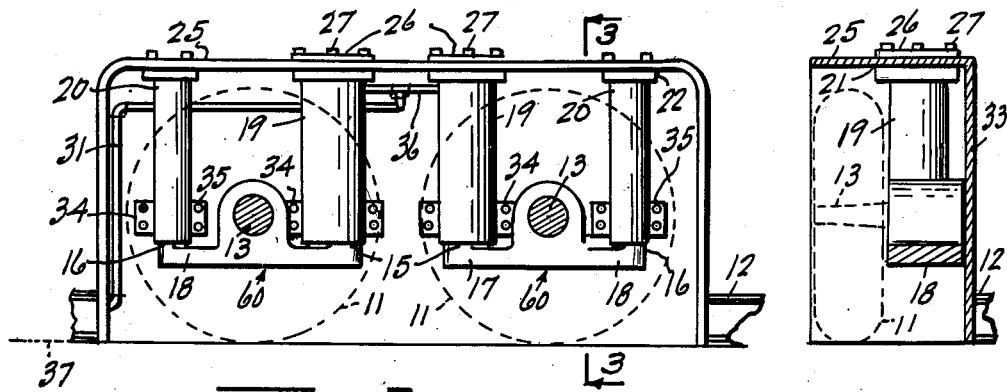
Fig. 2 is a side elevation of a dual wheel arrangement drawn to a reduced scale.
Fig. 3 is a section taken on line 3—3 of Fig. 2.

Fig. 1 shows the bed in a raised position for traveling while Fig. 2 shows the bed in a position where it rests on the ground.

Referring to Figs. 4 and 5, the same elevating and lowering means is provided for the forward end of a trailer with a front swivel axle, except, instead of having a fender for support, the sleeve 19 is supported by a gooseneck 38 to which it is bracketed as indicated at 39 and 40 but the sleeve 15 is provided with a base 41 having a yoke 42 which spans the front axle 43 and is pivotally supported thereby as indicated at 44; the combination of pressure fluid motors for all wheels being connected to a power equalizing system 45 as disclosed in my Patent No. 2,499,563, issued March 7, 1950, and specifically as shown, in my copending application Serial Number 89,425, filed April 25, 1949, for Equalizing Volume Power Distributor, and which therefore, does not form a part of this invention, and consists of a main cylinder 46 and a plurality of equalizing cylinders 47 all fixed to a common intermediate head 48, and with a piston 49 in the main cylinder and provided with a plunger 50 for each of the equalizing cylinders; a supply of fluid 51 and means 52 for delivering the fluid under high pressure to the main cylinder as through the pipe 53 or returning it to the supply through the pipe 54, and a connection from each of the equalizing cylinders to the respective pressure fluid motors, as shown at 55 for the head end pressure fluid motor, and as indicated at 56 and 57 which lead to the rear end pressure fluid motors illustrated in Figs. 1 and 2.

As will be noted, with this arrangement no fifth wheel is required, as the pair of sleeves 15 and 19 function as the fifth wheel, and because of the gap between the vehicle head 58, gooseneck 38 and guide, the axle with its wheels 59 can be turned through a complete circle.

If any of the pressure fluid motors is to be repaired or replaced, it is merely necessary to disconnect the fluid line 31, 36 or 55, remove the screws 27 and lift the pressure fluid motor out of the guide. This provides a rapid and easy repair or replacement job, and the pressure fluid motors, being of relatively small diameter will provide rapid elevating and lowering of the bed.

As will be noted further, the pressure fluid motors for both the front and rear ends operate in the same manner and are mounted identically, each cooperating between the vehicle as through the gooseneck or fender, and the support as the crosshead 60 or the base 41.

I claim:

1. Combination guiding means and pressure fluid motor comprising; a pair of telescopic sleeve members each having a head with one of said heads having an axial passage; a pressure fluid motor comprising a plunger, and a cylinder having a head, and insertible through said axial passage; and means for securing said head of said cylinder to the top of said one of said heads with the plunger slidable and sealed in said cylinder and cooperating with the other one of said heads of said sleeve members, whereby said pressure fluid motor is housed and sealed within said guiding means and thereby protected against dust and grit to prolong the life of the pressure fluid motor and minimize the need for repairs.

2. A fluid motor comprising; a first sleeve having a head end and supporting means for said sleeve; a second sleeve slidable within said first sleeve and having a base; a pressure fluid motor insertible and removable through said head end at will and comprising a cylinder having a head releasably securable to said head end and having a plunger to cooperate with said base, and a fluid connection for said cylinder, with said pressure fluid motor being confined solely to lifting operations, and said sleeves functioning as the guiding means and as a sealed housing for said pressure fluid motor for exclusion of dirt.

3. A guiding and elevating and lowering unit for a vehicle bed comprising; a first sleeve having a base; a second sleeve slidable on said first sleeve and having a head having an axial passage; a pressure fluid motor comprising a cylinder insertible through said passage and having a head removably secured to the top of the head on said second sleeve, and a plunger slidable in said cylinder and cooperative with the top side of said base, and a fluid connection for said cylinder, whereby said pressure fluid motor is removable and replaceable at will without affecting the assembly of said first and second sleeves.

4. A power lift comprising a telescopic housing consisting of a first sleeve having a head end, a second sleeve having a base and slidable in said first sleeve, a pressure fluid motor comprising a cylinder having an integral head of excess diameter equal to the diameter of said head end to coincidently form a head for said first sleeve, and means for securing said head to said head end, a plunger slidable in said cylinder and cooperative with said base, and a fluid connection for said cylinder; said pressure fluid motor being wholly enclosed within said telescopic housing with said housing functioning as guiding means and dirt excluding means and said pressure fluid motor being confined solely to lifting operations.

5. A telescopic housing having a head at each end, and a pressure fluid motor within said housing and cooperating between said heads for lifting operations with said housing operating as guiding means and dirt excluding means for said pressure fluid motor, and a fluid connection for said pressure fluid motor, said housing consisting of two cylindrical sleeves one slidable within the other, and said pressure fluid motor consisting of a cylinder and a plunger, with one end of said cylinder being formed integral axially with the head for the larger one of said sleeves, and the last mentioned head being removably secured to the sleeve to provide for removal of the pressure fluid motor at will without disturbing the sleeves.

ROBERT O. BILL.

References Cited in the file of this patent

UNITED STATES PATENTS

| Number | Name | Date |
|---|---|---|
| 843,208 | Hieber | Feb. 5, 1907 |
| 2,002,605 | Kincaid, Jr. | May 28, 1935 |
| 2,059,130 | May | Oct. 27, 1936 |
| 2,366,121 | Hurst | Dec. 26, 1944 |
| 2,475,443 | Bill | July 5, 1949 |
| 2,480,909 | Davis | Sept. 6, 1949 |